US008666834B2

(12) United States Patent
Kamimaeda et al.

(10) Patent No.: US 8,666,834 B2
(45) Date of Patent: Mar. 4, 2014

(54) ITEM RECOMMENDATION SYSTEM, ITEM RECOMMENDATION METHOD AND PROGRAM

(75) Inventors: Naoki Kamimaeda, Kanagawa (JP);
Katsuyoshi Kanemoto, Chiba (JP);
Masanori Miyahara, Tokyo (JP);
Takehiro Hagiwara, Tokyo (JP)

(73) Assignee: Sony Corporation, Tokyo (JP)

( * ) Notice: Subject to any disclaimer, the term of this patent is extended or adjusted under 35 U.S.C. 154(b) by 227 days.

(21) Appl. No.: 13/154,305

(22) Filed: Jun. 6, 2011

(65) Prior Publication Data

US 2011/0307350 A1 Dec. 15, 2011

(30) Foreign Application Priority Data

Jun. 15, 2010 (JP) ................................. P2010-135655

(51) Int. Cl.
*G06Q 30/00* (2012.01)
(52) U.S. Cl.
USPC ......................................... 705/26.1; 705/27.1
(58) Field of Classification Search
USPC ............................................... 705/26.1, 27.1
See application file for complete search history.

(56) References Cited

U.S. PATENT DOCUMENTS

2008/0250026 A1* 10/2008 Linden et al. .................... 707/10
2011/0093520 A1* 4/2011 Doyle et al. .................. 709/203

FOREIGN PATENT DOCUMENTS

JP 2003-167901 6/2003

OTHER PUBLICATIONS

Getting personal, McAllister, Neil. Web Techniques6. 11 (Nov. 2001): 35-37. Downloaded from ProQuestDirect on the Internet on Mar. 18, 2013, 3 pages.*

* cited by examiner

*Primary Examiner* — James Zurita
(74) *Attorney, Agent, or Firm* — Finnegan, Henderson, Farabow, Garrett & Dunner, L.L.P.

(57) ABSTRACT

Methods and systems include receiving feedback from one of a plurality of users for one of a plurality of items, storing the received feedback and past feedback received from the plurality of users, wherein the received feedback and past feedback are stored as combinations of users and items having feedback given by the users, calculating relevance between the one of the plurality of items and another one of the plurality of items, based on first information indicating a degree of feedback given by the one of the plurality of users for the plurality of items, and second information indicating a degree of stored past feedback given by the plurality of users to the plurality of items, and immediately recommending items to the one of the plurality of users, the recommended items having the highest relevance to the one of the plurality of items, based on the calculated relevance.

8 Claims, 16 Drawing Sheets

FIG.3
HISTORY TABLE

| USER ID | ITEM ID |
|---|---|
| 1 | 1 |
| 1 | 2 |
| 2 | 1 |
| 3 | 2 |
| ⋮ | ⋮ |

FIG.4
INTERMEDIATE VALUE TABLE

| ITEM ID | ITEM ID | VALUE |
|---|---|---|
| 1 | 1 | 300 |
| 1 | 2 | 100 |
| 2 | 3 | 400 |
| ⋮ | ⋮ | ⋮ |

FIG.5
RELEVANCE TABLE

| ITEM ID | ITEM ID | SCORE |
|---|---|---|
| 1 | 2 | 351 |
| 1 | 3 | 138 |
| ⋮ | ⋮ | ⋮ |

FIG.6
TASTE INFORMATION

| USER ID | ITEM ID | SCORE |
|---------|---------|-------|
| 1 | 1 | 1.0 |
| 1 | 2 | 0.3 |
| 2 | 1 | 1.2 |
| 3 | 2 | 0.5 |
| ⋮ | ⋮ | ⋮ |

FIG.7
PURCHASE HISTORY MATRIX (P-MATRIX)

|        | ITEM 1 | ITEM 2 | ITEM 3 | ITEM 4 |
|--------|--------|--------|--------|--------|
| USER 1 |        |        | 1      | 1      |
| USER 2 | 1      |        |        |        |
| USER 3 |        | 1      | 1      |        |
| USER 4 |        | 1      |        | 1      |
| USER 5 |        |        | 1      |        |

FIG.8
INTERMEDIATE VALUE MATRIX (D-MATRIX)

|        | ITEM 1 | ITEM 2 | ITEM 3 | ITEM 4 |
|--------|--------|--------|--------|--------|
| ITEM 1 | ///    | 3      | 4      | 3      |
| ITEM 2 | ///    | ///    | 4      | 3      |
| ITEM 3 | ///    | ///    | ///    | 4      |
| ITEM 4 | ///    | ///    | ///    | ///    |

RELEVANCE MATRIX (J-MATRIX)

|        | ITEM 1 | ITEM 2 | ITEM 3 | ITEM 4 |
|--------|--------|--------|--------|--------|
| ITEM 1 |        | 0      | 0      | 0      |
| ITEM 2 |        |        | 1/4    | 1/3    |
| ITEM 3 |        |        |        | 1/4    |
| ITEM 4 |        |        |        |        |

(RECOMMENDATION METHOD USING P, D, J-MATRIXES)

START

S101: IS THERE FEEDBACK? NO (loop back)

YES

S102: UPDATE P-MATRIX BASED ON FEEDBACK INFORMATION

S103: UPDATE D-MATRIX BASED ON UPDATED P-MATRIX

S104: UPDATE J-MATRIX BASED ON UPDATED D-MATRIX

S105: RECOMMEND ITEMS BASED ON UPDATED J-MATRIX AND TASTE INFORMATION

END (WHEN USER 5 PURCHASED ITEM 2)

P-MATRIX (BEFORE PURCHASE)

|        | ITEM 1 | ITEM 2 | ITEM 3 | ITEM 4 |
|--------|--------|--------|--------|--------|
| USER 1 |        |        | 1      | 1      |
| USER 2 | 1      |        |        |        |
| USER 3 |        | 1      | 1      |        |
| USER 4 |        | 1      |        | 1      |
| USER 5 |        |        | 1      |        |

P(2,5)=1(S112)

P-MATRIX (AFTER PURCHASE)

|        | ITEM 1 | ITEM 2 | ITEM 3 | ITEM 4 |
|--------|--------|--------|--------|--------|
| USER 1 |        |        | 1      | 1      |
| USER 2 | 1      |        |        |        |
| USER 3 |        | 1      | 1      |        |
| USER 4 |        | 1      |        | 1      |
| USER 5 |        | 1      | 1      |        |

(WHEN USER 5 PURCHASED ITEM 2)

P-MATRIX (AFTER UPDATE)

|        | ITEM 1 | ITEM 2 | ITEM 3 | ITEM 4 |
|--------|--------|--------|--------|--------|
| USER 1 |        |        | 1      | 1      |
| USER 2 | 1      |        |        |        |
| USER 3 |        | 1      | 1      |        |
| USER 4 |        | 1      |        | 1      |
| USER 5 |        | 1      | 1      |        |

$P(1,5) \neq 1$    $P(2,5)=1$    $P(3,5)=1$    $P(4,5) \neq 1$

UPDATE D (1, 2)    NOT UPDATE D    NOT UPDATE D    UPDATE D (2, 4)
(S116, S122)                                                                (S116, S122)

D-MATRIX (AFTER UPDATE)

|        | ITEM 1 | ITEM 2 | ITEM 3 | ITEM 4 |
|--------|--------|--------|--------|--------|
| ITEM 1 | ///    | 4(=3+1) | 4     | 3      |
| ITEM 2 | ///    | ///    | 4      | 4(=3+1) |
| ITEM 3 | ///    | ///    | ///    | 4      |
| ITEM 4 | ///    | ///    | ///    | ///    |

(WHEN USER 5 PURCHASED ITEM 2)

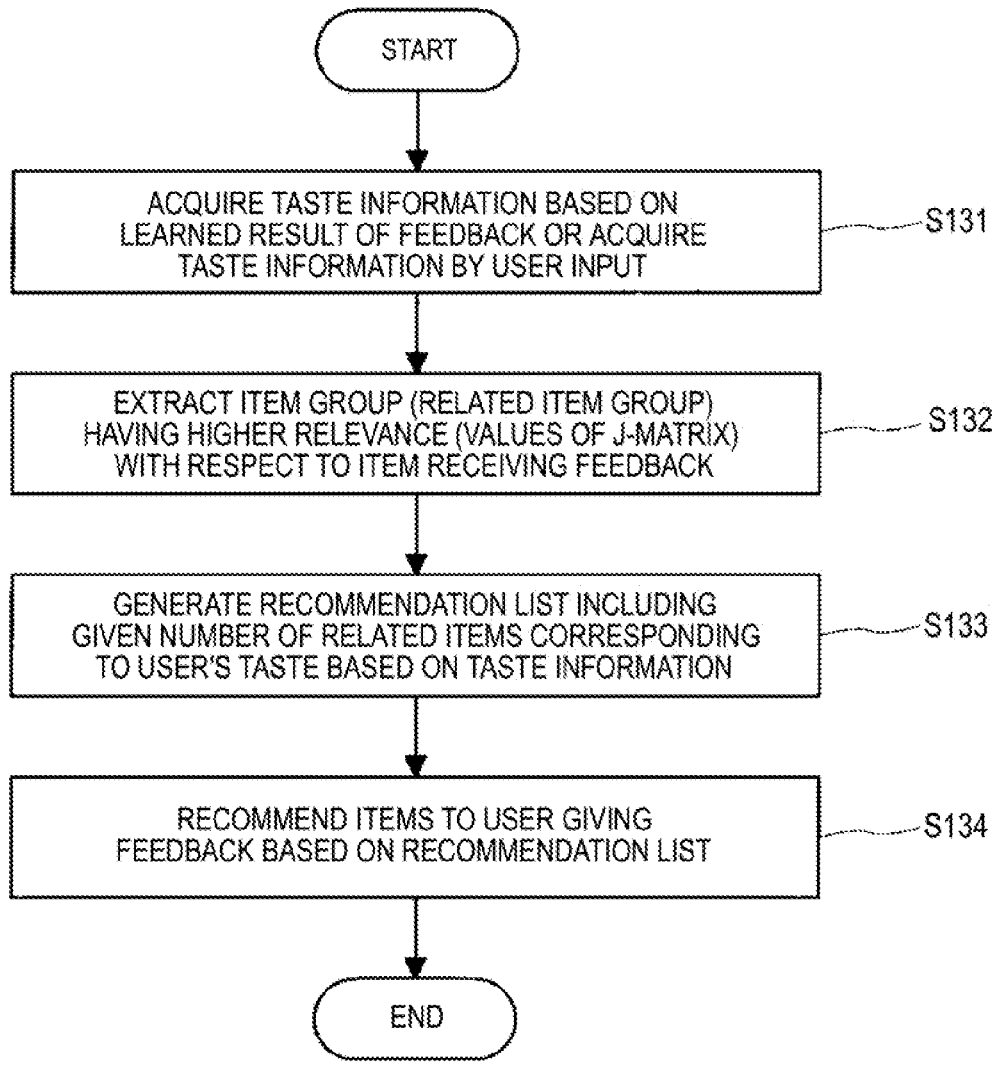

TABLE OF THE NUMBER OF CO-OCCURRENCES

| ITEM ID | ITEM ID | THE NUMBER OF CO-OCCURRENCES |
|---|---|---|
| 1 | 2 | 351 |
| 1 | 3 | 138 |

(APPROXIMATE RELEVANCE CALCULATION METHOD)

(CALCULATION METHOD OF UPDATE VALUE δ)

THE NUMBER OF PURCHASES IN TIME t TO TIME (t+1)

|  | ITEM 1 | ITEM 2 | ITEM 3 | ITEM 4 |
|---|---|---|---|---|
| THE NUMBER OF PURCHASES | 35 | 17 | 29 | 62 |

MAXIMUM VALUE n=62

J-MATRIX AT TIME t

|  | ITEM 1 | ITEM 2 | ITEM 3 | ITEM 4 |
|---|---|---|---|---|
| ITEM 1 |  | 0.10 | 0 | 0 |
| ITEM 2 |  |  | 0.25 | 0.33 |
| ITEM 3 |  |  |  | 0.15 |
| ITEM 4 |  |  |  |  |

COMPARISON

J-MATRIX AT TIME (t+1)

|  | ITEM 1 | ITEM 2 | ITEM 3 | ITEM 4 |
|---|---|---|---|---|
| ITEM 1 |  | 0.08 | 0.15 | 0.12 |
| ITEM 2 |  |  | 0.33 | 0.49 |
| ITEM 3 |  |  |  | 0.09 |
| ITEM 4 |  |  |  |  |

MAXIMUM VALUE OF DIFFERENCE d=△J(2,4)=0.49-0.33=0.16
UPDATE VALUE δ=d/n=0.16/62=0.00258

FIG.21

(WHEN USER WHO PURCHASED ITEMS 2, 3
IN THE PAST HAS PURCHASED ITEM 1 AT TIME (t+2))

J-MATRIX AT TIME (t+1)

|        | ITEM 1 | ITEM 2 | ITEM 3 | ITEM 4 |
|--------|--------|--------|--------|--------|
| ITEM 1 |        | 0.08   | 0.15   | 0.12   |
| ITEM 2 |        |        | 0.33   | 0.49   |
| ITEM 3 |        |        |        | 0.09   |
| ITEM 4 |        |        |        |        |

⇓ UPDATE OF J-MATRIX

J-MATRIX AT TIME (t+2)

|        | ITEM 1 | ITEM 2        | ITEM 3        | ITEM 4 |
|--------|--------|---------------|---------------|--------|
| ITEM 1 |        | $0.08+\delta$ | $0.15+\delta$ | 0.12   |
| ITEM 2 |        |               | 0.33          | 0.49   |
| ITEM 3 |        |               |               | 0.09   |
| ITEM 4 |        |               |               |        |

ITEM RECOMMENDATION SYSTEM, ITEM RECOMMENDATION METHOD AND PROGRAM

FIELD

The present disclosure relates to an item recommendation system, an item recommendation method and a program.

BACKGROUND

In recent years, businesses using networks are rapidly expanded. For example, a system of purchasing items at on-line stores on the network is widely used. In most of such on-line stores, a system of recommending items to users is provided. For example, when the user accesses to detailed information of a certain item, information of items relating to the item are presented as related items or recommended items to the user. Such system is realized by, for example, using a cooperative filtering method described in JP-A-2003-167901 (Patent Document 1). The cooperative filtering method is a recommendation method using information (for example, purchase history and so on) of users having similar taste.

SUMMARY

When using the above cooperative filtering method, it is possible to recommend items to a new user which has no purchase history by using information of users having similar taste to the user. On the other hand, in a case of a contact-based filtering method which recommends items by using purchase history of the user, it is difficult to recommend items to the new user who has no purchase history. Accordingly, the cooperative filtering method is effective with respect to the user who has little purchase history of items.

The content-based filtering method is a method of determining items to be recommended by analyzing purchase history of respective users, therefore, the method has an advantage that tastes of respective users can be reflected easily. In a state where the number of users is small and users having similar taste are difficult to be found, the content-based filtering method is more efficient than the cooperative filtering method.

At the on-line store, the purchase history of items, access history of detailed information and so on are analyzed by using the above filtering methods and so on, thereby preparing information for recommending items to the user. However, sufficiently long time is necessary for analyzing processing using the above filtering methods and so on. On the other hand, recommendation results of items have large effect on sales in the on-line store, therefore, a system of presenting items corresponding to the user's taste immediately is requested.

However, in present on-Line stores, a system in which purchase history and access history of detailed information are stored for a given period of time (for example, one day) and analysis processing by using the above filtering methods and so on is executed at given intervals (hereinafter referred to as batch processing) is used. Accordingly, when the user purchases an item, the purchase history is not reflected on the recommendation result at the time of purchasing. For example, when a user A purchases an item X, the purchase history of the user A is not reflected on the recommendation result with respect to a user B purchasing the item X until the batch processing is completed.

The example in which purchase history obtained when the user purchases items at on-line stores is used for recommendation is shown as the above, however, evaluation results obtained when the user evaluates a certain item, access history obtained when user accesses to detailed information of a certain item are also used for recommendation of items. In the following explanation, actions (for example, purchase, evaluation, information access and so on) of the user performed with respect to items or services (hereinafter referred to as items) are referred to as feedbacks.

In view of the above, it is desirable to provide a novel and improved item recommendation system, an item recommendation method and a program capable of realizing recommendation reflecting a feedback of the user immediately.

According to an embodiment of the present disclosure, there is provided an item recommendation system including a feedback receiving unit receiving feedbacks with respect to items by users, a feedback history storage unit storing information of feedbacks received at present or in the past by the feedback receiving unit in units of combinations of users and items, a relevance calculation unit calculating relevance between items base on first information indicating the degree in which the same user gives feedbacks to respective items and second information indicating the degree in which many users give feedbacks by using feedback information stored by the feedback history storage unit when receiving the feedback by the feedback receiving unit, and a recommendation unit immediately recommending items having higher relevance with respect to the item to the user who has given the feedback to the item by the feedback receiving unit based on the relevance calculated by the relevance calculation unit.

The recommendation system may further include a variation detection unit detecting a combination of items i, j, the relevance of which varies to the highest degree between a time $t_1$ and a time $t_2$ by comparing a relevance $J(t_1)$ between items calculated at the time $t_1$ by the relevance calculation unit and a relevance $J(t_2)$ between items calculated by the relevance calculation unit at the time $t_2$ which is the time next to the time $t_1$ and a relevance prediction unit predicting a relevance $J(t_3)$ between items at a time $t_3$ next to the time $t_2$ from a difference between relevances $J(t_2)-J(t_1)$ concerning items i, j detected by the variation detection unit. In this case, the recommendation unit recommends items based on the relevance calculated by the relevance calculation unit at a given timing and recommends items based on the relevance predicted by the relevance prediction unit at a timing different from the given timing.

The recommendation system can further include a taste information generation unit generating taste information indicating user's taste based on feedback information stored by the feedback history storage unit. In this case, the taste information generation unit generates taste information based on feedback information stored by the feedback history storage unit just before receiving a feedback by the feedback receiving unit, and the recommendation unit recommends items in which the taste is higher for the user who has given the feedback to the item by the feedback receiving unit from items having higher relevance based on taste information generated just before receiving the feedback by the feedback receiving unit.

When a priority coefficient is set to each item, the recommendation unit can be configured to recommend items having higher relevance with respect to the item to the user who has given the feedback to the item by the feedback receiving unit based on relevance calculated by multiplying the priority coefficient.

The feedback history storage unit can be configured to store the feedback history in a storage device connected through a network.

When the feedback information stored by the feedback history storage unit is P(i, u) at the time of receiving the feedback by a user u with respect to an item i by the feedback receiving unit, and when P(i, u)=1 is set in the case of receiving the feedback and P(i, u)=0 is set in the case of not receiving the feedback, a relevance J(i, j) between the item i and an item j(j≠i) is expressed by the later-described expressions (1), (2).

Also according to another embodiment of the present disclosure, there is provided an item recommendation method including receiving feedbacks with respect to items by users, storing information of feedbacks received at present or in the past by the feedback receiving unit in units of combinations of users and items, calculating relevance between items base on first information indicating the degree in which the same user gives feedbacks to respective items and second information indicating the degree in which many users give feedbacks by using feedback information stored by the step of storing feedback history when receiving the feedback in the step of receiving the feedback and recommending items having higher relevance with respect to the item immediately to the user who has given the feedback to the item in the step of receiving the feedback based on the relevance calculated in the step of calculating relevance.

Also according to still another embodiment of the present disclosure, there is provided a program for allowing a computer to execute a feedback receiving function receiving feedbacks with respect to items by users, a feedback history storage function storing information of feedbacks received at present or in the past by the feedback receiving function in units of combinations of users and items, a relevance calculation function calculating relevance between items base on first information indicating the degree in which the same user gives feedbacks to respective items and second information indicating the degree in which many users give feedbacks by using feedback information stored by the feedback history storage function when receiving the feedback by the feedback receiving function and a recommendation function immediately recommending items having higher relevance with respect to the item to the user who has given the feedback to the item by the feedback receiving function based on the relevance calculated by the relevance calculation function.

Also according to yet another embodiment of the present disclosure, there is provided a recording medium in which the above program is recorded, which can be read by the computer.

As described above, according to the embodiments of the present disclosure, it is possible to realize recommendation immediately reflecting the feedback of the user.

BRIEF DESCRIPTION OF THE DRAWINGS

FIG. 3 is an explanatory chart for explaining a configuration of a history table used in the recommendation system according to the embodiment;

FIG. 4 is an explanatory chart for explaining a configuration of an intermediate value table used in the recommendation system according to the embodiment;

FIG. 5 is an explanatory chart for explaining a configuration of a relevance table used in the recommendation system according to the embodiment;

FIG. 6 is an explanatory chart for explaining a configuration of taste information used in the recommendation system according to the embodiment;

FIG. 7 is an explanatory chart for explaining a configuration of a history matrix (P-matrix) used in the recommendation system according to the embodiment;

FIG. 8 is an explanatory chart for explaining a configuration of an intermediate value matrix (D-matrix) used in the recommendation system according to the embodiment;

FIG. 16 is an explanatory chart for explaining a recommend method using taste information according to the embodiment;

FIG. 17 is an explanatory chart for explaining a configuration of a table of the number of purchases used in the recommendation system according to the embodiment;

FIG. 21 is an explanatory chart for explaining the update method of the relevance table (J-matrix) according to the first modification example of the embodiment;

DETAILED DESCRIPTION

Hereinafter, a preferred embodiment of the present disclosure will be explained in detail with reference to the attached drawings. In the specification and the drawings, the same signs are given to components having substantially the same functional configurations to omit repeated explanation.

[Flow of Explanation]

The flow of explanation concerning the embodiment of the present disclosure described as follows will be briefly described.

First, a configuration of a recommendation system 10 according to the embodiment will be explained with reference to FIG. 1. Next, a configuration of a server device 11 and a configuration of a storage device 12 included in the recommendation system 10 of the embodiment will be explained with reference to FIG. 2. In the explanation, configurations of a history table, an intermediate value table, a relevance table and taste information used in the recommendation system 10 according to the embodiment will be also explained with reference to FIG. 3 to FIG. 6.

Next, configurations of a history matrix (P-matrix), an intermediate value matrix (D-matrix) and a relevance matrix (J-matrix) used in the recommendation system according to the embodiment will be explained with reference to FIG. 7 to FIG. 9. Additionally, a recommendation method of items according to the embodiment using the history matrix (P-matrix), the intermediate value matrix (D-matrix) and the relevance matrix (J-matrix) will be explained with reference to FIG. 10.

Next, the recommendation method of items according to the embodiment will be explained more specifically with reference to FIG. 11 and FIG. 12. In the explanation, update methods of the history matrix (P-matrix), the intermediate value matrix (D-matrix) and the relevance matrix (J-matrix) and a recommendation method using the taste information according to the embodiment will be specifically explained with reference to FIG. 13 to FIG. 16. Furthermore, configurations of a table of the number of purchases and a table of the number of co-occurrences used in the recommendation system according to the embodiment will be explained with reference to FIG. 17, FIG. 18 and FIG. 19.

Figures 18, 19:
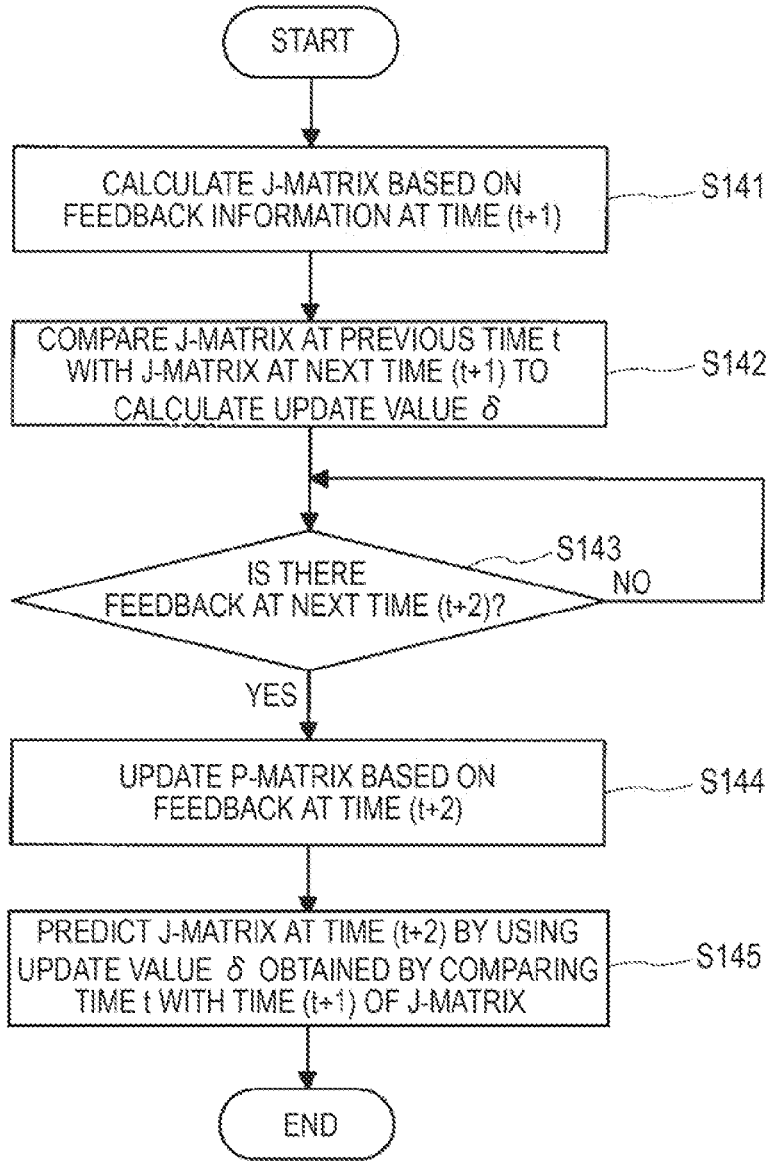
FIG. 18 is an explanatory chart for explaining a configuration of a table of the number of co-occurrences used in the recommendation system according to the embodiment.
FIG. 19 is an explanatory chart for explaining an update method of the relevance table (J-matrix) according to a first modification example of the embodiment.

Next, an update method of the relevance matrix (3-matrix) according to a first modification example of the embodiment will be explained with reference to FIG. 19 to FIG. 21. Next, an update method of the relevance matrix (J-matrix) using bias parameters according to a second modification example of the embodiment will be explained with reference to FIG. 22. Next, a hardware configuration capable of realizing functions of the server device 11 and user terminals 13 according to the embodiment will be explained with reference to FIG. 23. Lastly, technical ideas of the embodiment are summarized, then, operation and effect obtained from the technical ideas are briefly explained.

(Explanation Items)

1: Embodiment 1-1: Configuration of a recommendation system 10

1-2: Functional configurations of a server device 11 and a storage device 12

1-3: Recommendation method using P-matrix, D-matrix and J-matrix 1-3-1: Configurations of P-matrix, D-matrix and J-matrix 1-3-2: General flow of processing 1-3-3: Specific flow of processing 1-3-4: Recommendation method using taste information 1-3-5: About efficiency method 1-4: Modification Examples 1-4-1: Approximate update method of J-matrix (first modification example)

1-4-2: Update method of J-matrix based on bias parameters (second modification example)

1-5: Hardware Configuration

2: Brief

<1: Embodiment>

The embodiment of the present disclosure will be explained. The embodiment relates to the system executing recommendation reflecting the user's taste and a trend of the whole users immediately in consideration of effects with respect to the trend of the whole users in addition to the user's taste when receiving a feedback from the user.

[1-1: Configuration of a Recommendation System 10]

First, the configuration of the recommendation system 10 according to the embodiment will be explained with reference to FIG. 1. FIG. 1 is an explanatory view for explaining the configuration of the recommendation system 10. The system configuration of the recommendation system 10 shown in FIG. 1 is one example.

Figure 1:
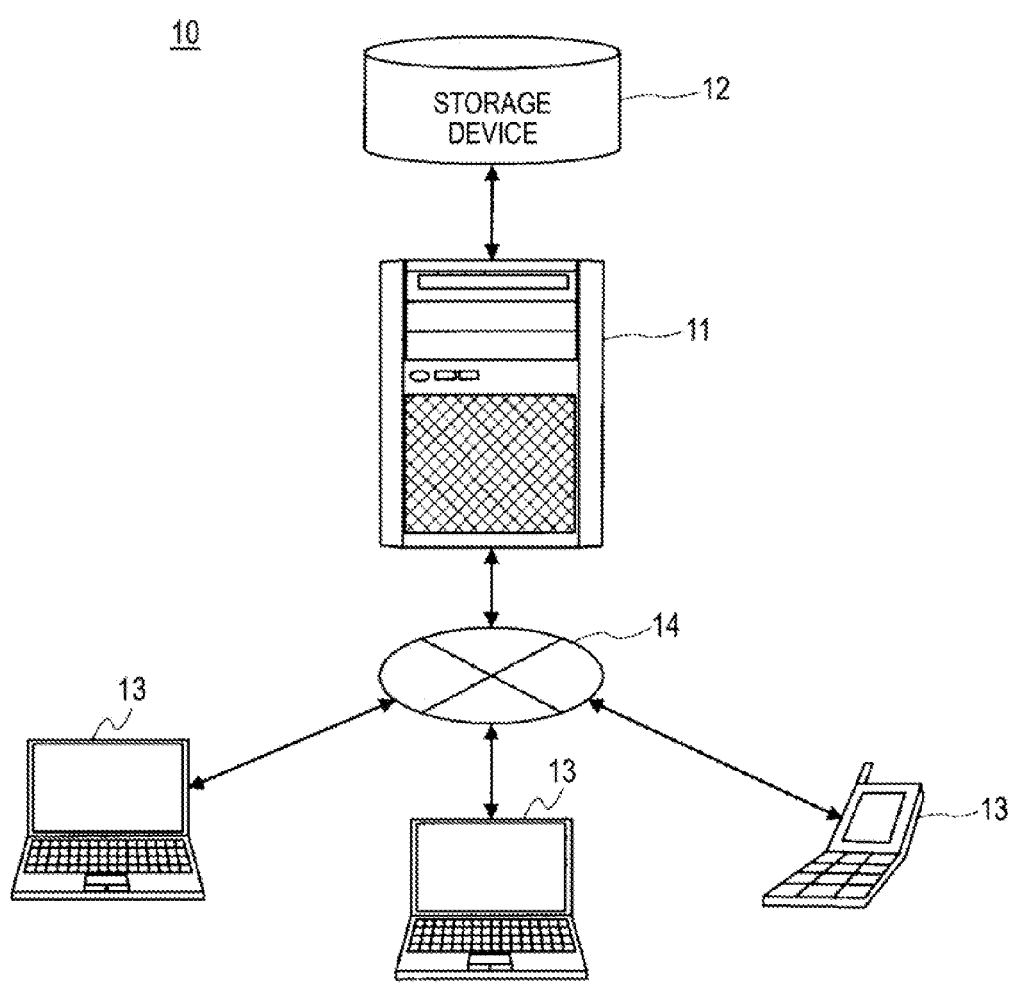
FIG. 1 is an explanatory view for explaining a configuration of a recommendation system according to an embodiment of the present disclosure.

As shown in FIG. 1, the recommendation system 10 includes the server device 11, the storage device 12 and plural user terminals 13. The server device 11 is connected to the plural user terminals 13 through a network 14. A personal computer and a cellular phone are shown as examples of the user terminals 13 in FIG. 1, however, the forms of the user terminals 13 are not limited to the above and an information terminal, a game machine, a video device, information home appliances and so on can be applied.

The server device 11 is a means for receiving a feedback of the user and providing services for the user in accordance with the received feedback. For example, the server device 11 has a function of an on-line store, providing a sales service of items for the user. The server device 11 provides item information to the user terminals 13 through the network 14 and provides services such as an on-line payment service in accordance with feedbacks received from the user terminals 13. The server device 11 further stores information of feedbacks (for example, purchase history and an evaluation value) in the storage device 12 when receiving feedbacks from the user terminals 13. The storage device 12 can be provided inside a casing of the server device 11.

Information of the feedbacks stored in the storage device 12 is used for analyzing the user's taste or for analyzing relevance between items. For example, the server device 11 analyzes the taste of each user based on the number of purchasing items by each user and evaluation values added to respective items by each user and generates taste information in which high scores are assigned to items having the large number of purchases and items having high evaluation values (for example, refer to FIG. 6). The server device 11 also analyzes relevance between items based on existence of the feedback added with respect to respective items by each user and calculates relevance between items (for example, refer to FIG. 5). The server device 11 further recommends items relating to the item to which the feedback has been given to the user who has given the feedback based on taste information and relevance between items.

The above is the explanation of the configuration of the recommendation system 10. The recommendation of items in the recommendation system 10 is realized by functions of the server device 11 and the storage device 12. Accordingly, the explanation will be made with a focus on the functional configurations of the server device 11 and the storage device 12 as follows.

[1-2: Functional Configurations of the Server Device 11 and the Storage Device 12]

Figure 2:
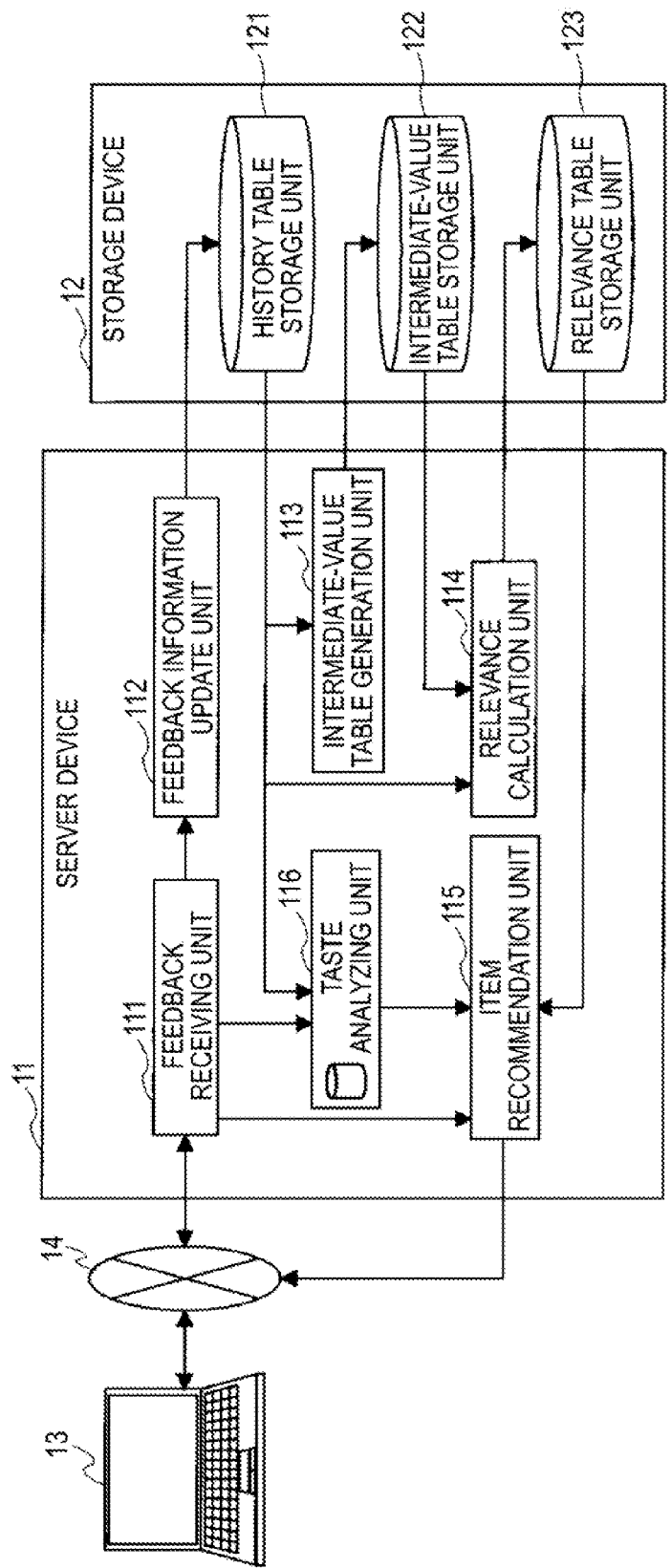
FIG. 2 is an explanatory diagram for explaining a configuration of a server device and a configuration of a storage device included in the recommendation system according to the embodiment.

The functional configuration of the server device 11 and the storage device 12 according to the embodiment will be explained with reference to FIG. 2. FIG. 2 is an explanatory view for explaining functional configurations of the server device 11 and the storage device 12 according to the embodiment.

As shown in FIG. 2, the server device 11 includes a feedback receiving unit 111, a feedback information update unit 112, an intermediate-value table generation unit 113, a relevance calculation unit 114, an item recommendation unit 115 and a taste analyzing unit 116. The storage device 12 chiefly includes a history table storage unit 121, an intermediate-value table storage unit 122 and a relevance table storage unit 123.

First, a feedback given from the user by using the user terminal 13 is inputted into the feedback receiving unit 111. For example, when the user executes purchase operation of an item, information indicating purchase of the item is inputted into the feedback receiving unit 111 as the feedback. The feedback information inputted in the feedback receiving unit 111 is inputted into the feedback information update unit 112. When the feedback information is inputted, the feedback information update unit 112 stores the inputted feedback information in the history table storage unit 121.

The history table as shown in FIG. 3 is stored in the history table storage unit 121. The history table stores information indicating combinations of items which have received feedbacks and the users who has given the feedbacks is stored so that which user has given the feedback to which item can be seen.

In the history table shown in FIG. 3 as an example, "User ID" indicates identification information of users who have given feedbacks. "Item ID" indicates identification information of items to which feedbacks are given. Accordingly, it is found that a user having "User ID"=1 has given the feedback with respect to items having "Item ID"=1, 2 from the example of FIG. 3. Similarly, a user having "User ID"=2 has given the feedback with respect to the item having "Item ID"=1 and a user having "ID item"=3 has given the feedback with respect to the item having "ID item"=2.

When the feedback information is stored in the history table storage unit 121 by the feedback information update unit 112, the intermediate-value table generation unit 113 generates the intermediate value table (refer to FIG. 4) based on the history table stored in the history table storage unit 121. The intermediate value table indicates information concerning relevance between items. The intermediate value table generated by the intermediate-value table generation unit 113 is stored in the intermediated-value table storage unit 122.

When the intermediate value table is stored in the intermediate-value table storage unit 122, the relevance calculation unit 114 calculates the relevance between items by using the intermediate value table stored in the intermediate-value table storage unit 122. Then, the relevance between items calculated by the relevance calculation unit 114 is stored in the relevance table storage unit 123 as the relevance table (refer to FIG. 5).

When the relevance between items is stored in the relevance storage unit 123, the item recommendation unit 115 selects an item group having high relevance with respect to the item to which the feedback has been given based on the relevance table stored in the relevance storage unit 123. Next, the item recommendation unit 115 selects a given number of items corresponding to the user's taste from the selected item group and recommends the items to the user who has given the feedback. At this time, the item recommendation unit 115 selects the given number of items corresponding to the user's taste from the selected item group based on taste information generated by the taste analyzing unit 116.

For example, the taste analyzing unit 116 assigns higher scores to items to which many feedbacks were given in the past by the users who have given the feedbacks, storing scores assigned to respective items as taste information (referred to FIG. 6). In the example of FIG. 6, the user having "User ID"=1 has a higher taste for the item having "Item ID"=1. It is also preferable that the taste analyzing unit 116 has a configuration of assigning higher scores to items to which the user who has given the feedback gave good feedbacks in the past.

The above is the explanation of the functional configurations of the server device 11 and the storage device 12. However, in the above explanation, configurations of the history table, the intermediate value table and the relevance table as well as a method of calculating stored values of the intermediate value table from stored values of the history table and a method of calculating stored values of the relevance table from stored values of the intermediate value table are omitted. Accordingly, a specific method of calculating relevance between items from feedback information and a recommendation method of items based on the relevance will be explained in more detail.

[1-3: Recommendation Method Using P-Matrix, D-Matrix and J-Matrix]

The server device 11 according to the embodiment uses the history table, the intermediate value table and the relevance table for selecting items to be recommended to the user who has given the feedback. However, the history matrix (hereinafter referred to as P-matrix), the intermediate value matrix (hereinafter referred to as D-matrix) and the relevance matrix (hereinafter referred to as J-matrix) as shown in FIG. 7 to FIG. 9 are actually used instead of using the history table, the intermediate value table and the relevance table shown in FIG. 3 to FIG. 5.

(1-3-1: Configurations of P-Matrix, D-Matrix and J-Matrix)

Here, configurations of P-matrix, D-matrix and J-matrix will be explained.

(P-Matrix)

The P-matrix is a matrix indicating the relation between users who have given feedbacks and items receiving the feedbacks as shown in FIG. 7. When a user u gives a feedback to an item i, 1 is inputted to an element P(i, u) corresponding to the user u and the item i. For example, 1 is inputted to a column (element P(1, 2) of the P-matrix) corresponding to a user 2 (User 2) and an item 1 (Item 1), therefore, it is found that the user 2 has given the feedback with respect to the item 1.

The P-matrix is stored in the history table storage unit 121. When the feedback receiving unit 111 receives the feedback, the feedback information update unit 112 updates the P-matrix stored in the history table storage unit 121.

(D-Matrix)

The D-matrix is a matrix indicating the relation between items as shown in FIG. 8. The D-matrix is used for calculating the later-described J-matrix, which is calculated based on the P-matrix. An element $D(i, j)$ of the D-matrix concerning an item i and an item j is defined by the following expression (1). The D-matrix is generated by the intermediate-value table generation unit 113 and stored in the intermediate-value table storage unit 122. As the D-matrix is symmetrical with respect to i, j, it is sufficient that only elements of i>j are stored in the intermediate-value table storage unit 122 as shown in FIG. 8.

$$D(i, j) = \sum_v P(i, v) + \sum_v P(j, v) - \sum_v P(i, v) \cdot P(j, v) \quad (1)$$

(J-Matrix)

Figures 9, 10:
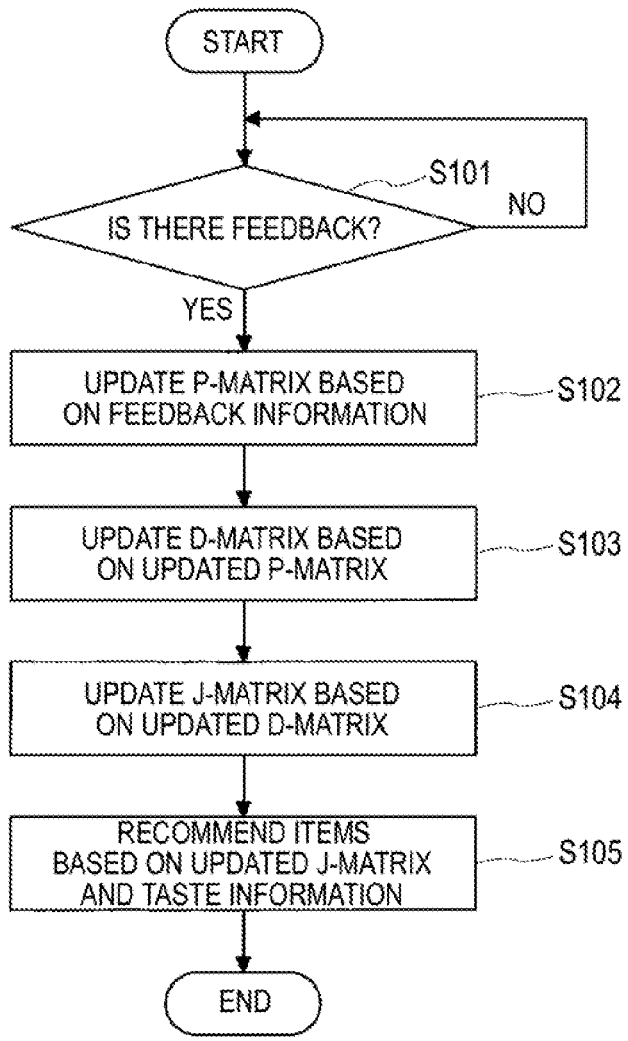
FIG. 9 is an explanatory chart for explaining a configuration of a relevance matrix (J-matrix) used in the recommendation system according to the embodiment.
FIG. 10 is an explanatory chart for explaining a recommendation method of items according to the embodiment.

The J-matrix is a matrix indicating relevance between items as shown in FIG. 9. The J-matrix is calculated based on the P-matrix and the D-matrix. An element J(i, j) of the J-matrix concerning an item i and an item j is defined by the following expression (2). The J-matrix is calculated by the relevance calculation unit 114 and stored in the relevance table storage unit 123. As the J-matrix is symmetrical with respect to i, j, it is sufficient that only elements of i>j are stored in the relevance table storage unit 123 as shown in FIG. 9.

$$J(i, j) = \frac{\sum_v P(i, v) \cdot P(j, v)}{D(i, j)} \quad (2)$$

The above is the explanation of the configurations of P-matrix, D-matrix and J-matrix. Hereinafter, the update methods of the above P-matrix, D-matrix and J-matrix and the recommendation method of items using the above methods will be explained.

(1-3-2: General Flow of Processing)

First, the general flow of processing relating to the recommendation method of items using P-matrix, D-matrix and J matrix will be explained with reference to FIG. 10. FIG. 10 is an explanatory chart for explaining the general flow of processing relating to the recommendation method of items using P-matrix, D-matrix and J matrix.

As shown in FIG. 10, first, the server device 11 determines whether there is a feedback or not (S101). When receiving the feedback by the feedback receiving unit 111, the server device 11 allows the process to proceed to Step S102. On the other hand, when the feedback is not received by the feedback receiving unit 111, the server device 11 returns the process to Step S101. When the process proceeds to Step S102, the server device 11 updates the P-matrix stored in the history table storage unit 121 based on feedback information received by the feedback receiving unit 111 using the function of the feedback information update unit 112 (S102).

Subsequently, the server device 11 which has updated the P-matrix stored in the history table storage unit 121 updates the D-matrix stored in the intermediate-value table storage unit 122 based on the updated P-matrix using the function of the intermediate-value table generation unit 113 (S103). Next, the server device 11 which has updated the D-matrix stored in the intermediate-table storage unit 122 updates the J-matrix stored in the relevance table storage unit 123 based on the updated D-matrix and the P-matrix using the function of the relevance calculation unit 114 (Step S104). Next, the server device 11 recommends items relating to the item receiving the feedback based on the updated J-matrix and taste information using the function of the item recommendation unit 115 (S105).

The above is the explanation of the general flow of the processing relating to the recommendation method of items using P-matrix, D-matrix and J-matrix.

(1-3-3: Specific Flow of Processing)

Next, specific update processing of P-matrix, D-matrix and J-matrix will be explained with reference to FIG. 11 and FIG. 12. FIG. 11 and FIG. 12 are explanatory charts for explaining specific update processing of P-matrix, D-matrix and J-matrix. Here, the specific processing flow executed when the user u purchases the item i will be explained as an example. The feedbacks other than the purchase are the same as this case.

Figure 11:
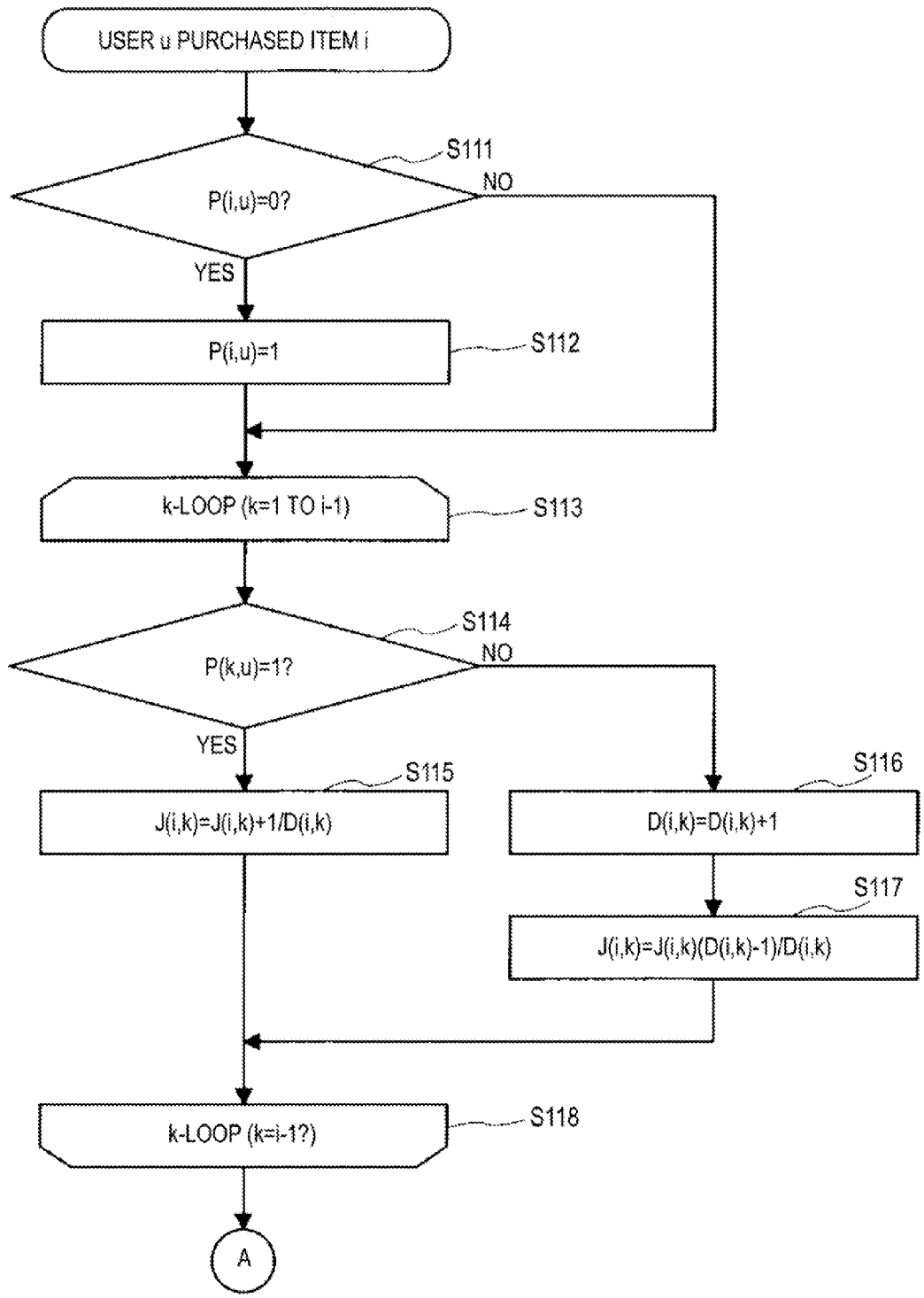
FIG. 11 is an explanatory chart for specifically explaining the recommendation method of items according to the embodiment.
Figure 12:
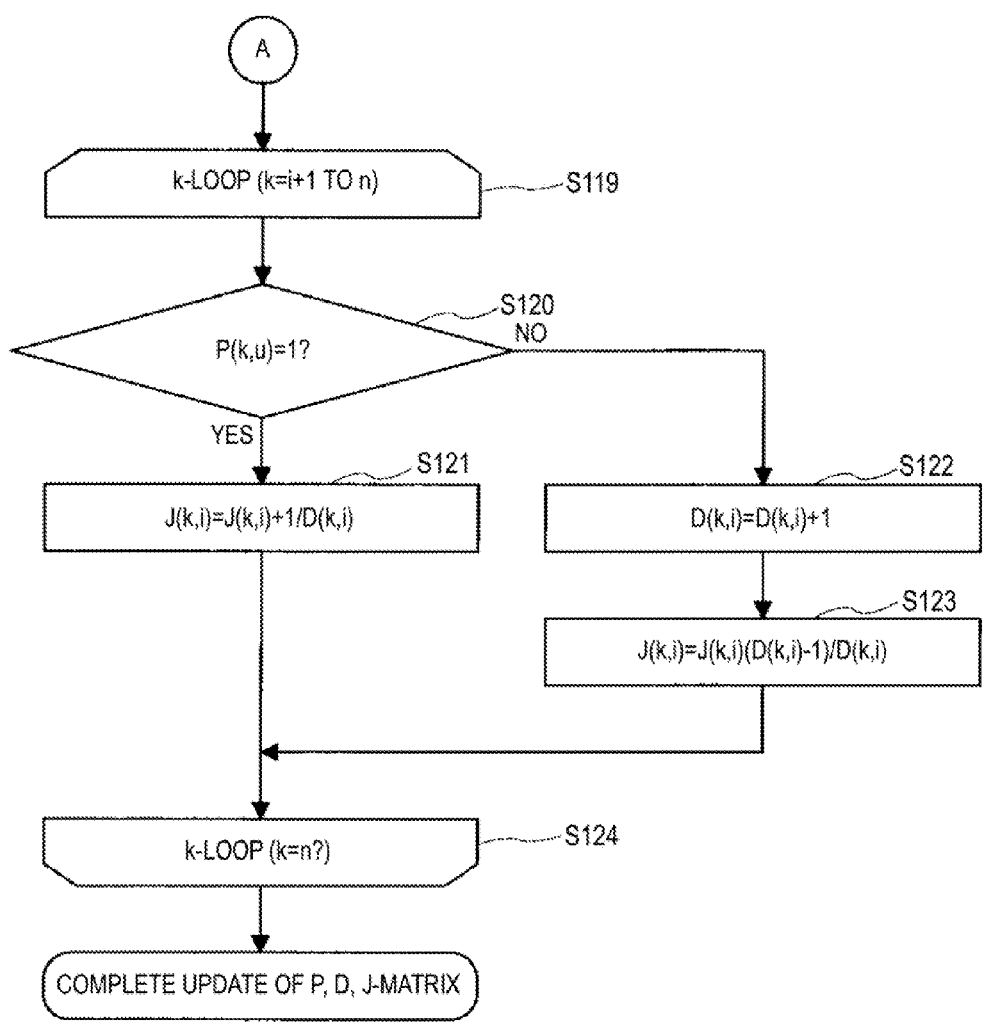
FIG. 12 is an explanatory chart for specifically explaining the recommendation method of items according to the embodiment.

First, as shown FIG. 11, the server device 11 determines whether the element P(i, u) of the P-matrix is 0 or not by referring to the P-matrix stored in the history table storage unit 121 (S111). When the element P(i, u) of the P-matrix is 0, the server device 11 allows the process to proceed to Step S112. On the other hand, when the element. P(i, u) of the P-matrix is not 0, the server device 11 allows the process to proceed to Step S113. The case where the element P(i, u) of the P-matrix is 0 indicates a case where the user u has not given the feedback to the item i before.

Figure 13:
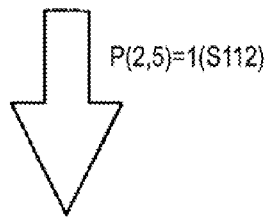
FIG. 13 is an explanatory chart for explaining an update method of the history matrix (P-matrix) according to the embodiment.

When the process proceeds to Step S112, the server device 11 sets 1 in the element P(i, u) of the P-matrix and updates the P-matrix stored in the history table storage unit 121 using the function of the feed back information update unit 112 (S112). For example, when the user 5 purchased the item 2, the element P(2, 5) of the P-matrix is updated to 1 as shown in FIG. 13. The server device 11 who has updated the P-matrix allows the process to Step S113.

When the process proceeds to Step S113, the server device 11 starts a processing loop concerning a parameter k (k=1 to i−1) (S113). First, the server device 11 determines whether an element P(k, u) of the P-matrix is 1 or not by referring to the updated P-matrix stored in the history table storage unit 121 (S114). When the matrix P(k, u) of the P-matrix is 1, the server device 11 allows the process to Step S115. On the other hand, when the matrix P(k, u) of the P-matrix is not 1, the server device 11 allows the process to proceed to Step S116.

When the process proceeds to Step S115, the server device 11 updates the J-matrix stored in the relevance storage unit 123 by using an element D(i, k) of the D-matrix by referring to the D-matrix stored in the intermediate-value table storage unit 122 (S115). Specifically, the server device 11 adds 1/D(i, k) to the element J(i, k) of the J-matrix stored in the relevance storage unit 123 to calculate a new element J(i, k) of the J-matrix using the function of the relevance calculation unit 114. Then, the new element J(i, k) of the J-matrix is stored in the relevance storage unit 123 and the process proceeds to Step S118.

When the process proceeds to Step S116 in Step S114, the server device 11 adds 1 to the element D(i, k) of the D-matrix stored in the intermediate-value table storage unit 122 to calculate a new element D(i, k) of the D-matrix by the function of the intermediate-value table generation unit 113 (S116). Then, the new element D(i, k) of the D-matrix is stored in the intermediate-value table storage unit 122 and the process proceeds to Step S117.

Next, the server device 11 calculates a new element J(i, k) of the J-matrix by using the updated D-matrix stored in the intermediate-value table storage unit 122 and the J-matrix stored in the relevance table storage unit 123 by the function of the relevance calculation unit 114 (S117). At this time, the server device 11 calculates the new element J(i, k) of the J-matrix based on the following expression (3) by using the function of the relevance calculation unit 114. Then the new element J(i, k) of the J-matrix is stored in the relevance table storage unit 123 and the process proceeds to Step S118.

$$J(i, k) = J(i, k) \frac{D(i, k) - 1}{D(i, k)} \quad (3)$$

When the process proceeds to Step S118, the server device 11 determines whether the process loop with respect to the parameter k is completed or not (S118). Specifically, whether the parameter k is i−1 or not is determined in Step S118. When k<i−1, 1 is added to the parameter k and the process returns to Step S113. On the other hand, when k=i−1, the process proceeds to Step S119 (FIG. 12).

Figure 14:
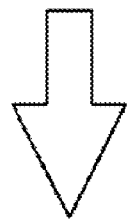
FIG. 14 is an explanatory chart for explaining an update method of the intermediate value matrix (D-matrix) according to the embodiment.
Figure 15:
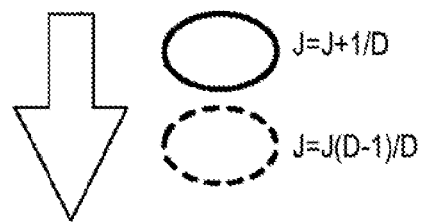
FIG. 15 is an explanatory chart for explaining an update method of the relevance matrix (J-matrix) according to the embodiment.

Here, supplementary explanation of the update processing of the D-matrix (refer to S114, S116) and the update processing of the J-matrix (refer to S114, S115 and S117) will be made with specific examples while referring to FIG. 14 and FIG. 15. In this case, a case where the user 5 has purchased the item 2 will be considered as an example (u=5, i=2). The update method of the P-matrix when the user 5 has purchased the item 2 is the same as in the above explanation made with reference to FIG. 13.

In the case where the user 5 has purchased the item 2, the element P(2, 5) of the P-matrix is updated to 1 as shown in FIG. 13 (corresponding to Step S112).

When P(2, 5) is updated, the processing loop of the parameter k (k=1 to 4) in Step S113 to S118 is started. First, whether P(k, 5) is 1 or not is determined in Step S114. In the example of FIG. 14, P(1, 5)≠1, P(2, 5)=1, P(3, 5)=1, P(4, 5)≠1, in the updated P-matrix, therefore, the process proceeds to Step S115 when k=1, 4, and the process'proceeds to Step S116 when k=2, 3.

The update processing of the D-matrix is not executed when the process proceeds to Step S115. That is, when k=2, 3, the update processing of the D-matrix is not executed. On the other hand, when the process proceeds to Step S116, the update processing of the D-matrix is executed. Specifically, when k=1, 4, the update processing of the D-matrix in Step S116 is executed. Therefore, in the example of FIG. 14, only D(1,2) and D(2, 4) are update targets in the D-matrix and 1 is added to be updated to new D(1,2) and D(2, 4) respectively.

Next, the update processing of the J-matrix is executed. When the process proceeds to Step S115 (when k=2, 3), 1/D(2, 3) is added to J(2, 3) to be updated to a new J(2, 3) as shown in FIG. 15. On the other hand, when the process proceeds to Step S117 (when k=1, 4), elements J are updated to new J(1, 2) and J(2, 4) based on the above expression (3) as shown in FIG. 15.

As explained above, the D-matrix and the J-matrix are updated in the processing loop (S113 to S118) concerning the parameter k (k=1 to i−1). When the processing loop (S113 to S118) is completed, the process proceeds to Step S119 (FIG. 12).

When the process proceeds to Step S119 (FIG. 12), the server device 11 starts the processing loop (k=i+1 to n) concerning the parameter k (S119). First, the server device 11 determines whether the element P(k, u) of the P-matrix is 1 or not by referring to the updated P-matrix stored in the history table storage unit 121 (S120). When the element P(k, u) of the P-matrix is 1, the server device 11 allows the process to proceed to Step S121. On the other hand, when element P(k, u) of the P-matrix is not 1, the server device 11 allows the process to proceed to Step S122.

When the process proceeds to Step S121, the server device 11 updates the J-matrix stored in the relevance table storage unit 123 by using the element D(k, i) of the D-matrix by referring to the D-matrix stored in the intermediate-value table storage unit 122 (S121). Specifically, the server device 11 adds 1/D(k, i) to the element J(k, i) of the J-matrix stored in the relevance table storage unit 123 to calculate a new element J(k, i) of the J-matrix using the function of the relevance calculation unit 114. Then, the new element J(k, i) of the J-matrix is stored in the relevance table storage unit 123 and the process proceeds to Step S124.

When the process proceeds to Step S122 in Step S120, the server device 11 adds 1 to the element D(k, i) of the D-matrix stored in the intermediate-value table storage unit 122 to calculates a new element D(k, i) of the D-matrix using the function of the intermediate-value table generation unit 113 (S122). Then, the new element D(k, i) of the D-matrix is stored in the intermediate-value table storage unit 122 and the process proceeds to Step S123.

Next, the server device 11 calculates a new element J(k, i) of the J-matrix by using the updated D-matrix stored in the intermediate-value table storage unit 122 and the J-matrix stored in the relevance table storage unit 123 using the function of the relevance calculation unit 114 (S123). At this time, the server device 11 calculates a new element J(k, i) of the J-matrix based on the following expression (4) using the function of the relevance calculation unit 114. Then, the new element J(k, i) of the J-matrix is stored in the relevance table storage unit 123 and the process proceeds to Step S124.

$$J(k, i) = J(k, i) \frac{D(k, i) - 1}{D(k, i)} \quad (4)$$

When the process proceeds to Step S124, the server device 11 determines whether the processing loop concerning the parameter k is completed or not (S124). Specifically, whether the parameter k is n or not is determined in Step S124. When k<n, 1 is added to the parameter k and the process returns to Step S119. On the other hand, when k=n, the series of processing relating to the update of P-matrix, D-matrix and J-matrix is completed. The specific update methods of the D-matrix and the J-matrix in the processing loop of Step S119 to S124 are substantially the same as the specific update methods of the D-matrix and the J-matrix in the processing loop of Step S113 to S118 explained with reference to FIG. 14 and FIG. 15.

The above is the explanation of the update methods of P-matrix, D-matrix and J-matrix.

(1-3-4: Recommendation Method Using Taste Information)

Next, the processing flow relating to a recommendation method of items using taste information and the J-matrix will be explained with reference to FIG. 16. FIG. 16 is an explanatory chart for explaining the processing flow relating to the recommendation method of items using taste information and the J-matrix.

As shown in FIG. 16, first, the server device 11 learns the feedback and acquires taste information based on the learned result using the function of the taste analyzing unit 116 (S131). The server device 11 can be configured to use taste information inputted by a user's hand using the function of the taste analyzing unit 116.

For example, feedbacks such as purchase history, evaluation values and access history of detailed information are inputted to the taste analyzing unit 116 through the feedback receiving unit 111. When such feedbacks are inputted, the taste analyzing unit 116 assigns higher scores to items having higher purchase frequency, items having higher evaluation values and items having higher access frequency of detailed information to generate taste information as shown in FIG. 6. As shown in FIG. 6, the taste information is expressed by scores indicating tastes of respective users with respect to respective items. Therefore, it is possible to detect items preferred by the user by comparing scores of respective items with respect to the user who gave feedbacks and extracting items having higher scores in the taste information.

Here, supplementary explanation of the generation method of taste information will be made. As described above, the taste information is generated based on feedbacks given by the user. However, there are various types of feedbacks such as purchase, evaluation and access to detailed information. For example, it is conceivable that the user's taste is higher in the purchased items than in items detailed information of which has been just accessed. Naturally, it is conceivable that the user's taste is higher in items to which higher evaluation values were added than in items to which lower evaluation values were added. Therefore, it is necessary to consider weight corresponding to types of feedbacks when generating taste information.

For example, when a score indicating a taste degree of the user u with respect to the item i is expressed as UP (u, i), a weight with respect to the k-th feedback is expressed as $a_k$, and a score added when the k-th feedback with respect to the item i is given (the score not depending on types of feedbacks) is expressed as $x_{i,k}$, the score UP(u, i) is expressed by the following expression (5). The score $x_{i,k}$ can be set to a given value not depending on k as well as set to a score varying in accordance with k. For example, it is also preferable that the score $x_{i,k}$ is increased in the order of timing in which feedbacks were given. As the weight $a_k$, for example, a large weight value (1.0) is set to the purchase, an intermediate weight (0.6) is set to the evaluation and a low weight value (0.3) is set to the access to the detailed information.

$$UP(u, i) = \sum_k a_k x_{i,k} \quad (5)$$

When the taste information is generated by the taste analyzing unit 116 as described above, the server device 11 inputs the taste information generated by the taste analyzing unit 116 to the item recommendation unit 115. The server device 11 also extracts an item group relating to the item which has received the feedback (hereinafter referred to as a related item group) by the function of the item recommendation unit 115 (S132). At this time, the server device 11 refers to the J-matrix stored in the relevance table storage unit 123 to extracts the item group having higher correlation values (values of the J-matrix) with respect to the item receiving the feedback by the function of the item recommendation unit 115.

The server device 11 which has extracted the related item group selects a given number of items corresponding to the user's taste (having higher scores) from the related item group by using taste information inputted by the taste analyzing unit 116 by the function of the item recommendation unit 115. Then, the server device 11 generates a recommendation list including items selected from the related item group (hereinafter, referred to as related items) by the function of the item recommendation unit 115 (S133). Subsequently, the server device 11 recommends related items included in the recommendation list to the user who has given the feedback by the function of the item recommendation unit 115 (S134).

The above is the explanation of the recommendation method using the taste information.
(1-3-5: About Efficiency Method)

Next, devices for increasing calculation efficiency at the time of calculating the J-matrix and use efficiency of a memory will be explained with reference to FIG. 17 and FIG. 18. FIG. 17 and FIG. 18 are explanatory charts for explaining devices for increasing the calculation efficiency at the time of calculating the J-matrix and the use efficiency of the memory. As described above, the calculation of the J-matrix corresponds to calculation of the above expressions (1), (2). When referring to the above expressions (1), (2), it is found that two kinds of sums $S_1$, $S_2$ concerning elements of the P-matrix (the following expressions (6), (7)) are included in the calculation.

$$S_1(i) = \sum_v P(i, v) \quad (6)$$

$$S_2(i, j) = \sum_v P(i, v) \cdot P(j, v) \quad (7)$$

The above $S_1(i)$ indicates the frequency in which all users gave feedbacks to the item i. On the other hand, the above $S_2(i, j)$ indicates the frequency in which the same user gave the feedback to both of the items i, j. For example, when the type of the feedback is the purchase, the number of purchases in each item corresponds to the above expression (6) as shown in FIG. 17. Additionally, the number of purchases (the number of co-occurrences) in each combination of items corresponds to the above expression (7) as shown in FIG. 18. Therefore, the sum calculation represented by the above expressions (6), (7) can be omitted by storing tables of the number of purchases and the number of co-occurrences as shown in FIG. 17 and FIG. 18. As a result, the calculation of the J-matrix expressed in the above expressions (1), (2) can be made more effective.

The above is the explanation of the method of allowing the calculation at the time of calculating the J-matrix to be more effective.
[1-4: Modification Examples]

Next, modification examples of the embodiment will be explained.
(1-4-1 Approximate Update Method of J-Matrix (First Modification Example))

When applying the recommendation method of items using P-matrix, D-matrix and J-matrix explained above, the recommendation of related items reflecting the feedback can be executed in real time at the time of receiving the feedback by the user. However, there is a demand for reducing a calculation load of J-matrix to reduce time necessary for recommending related items as short as possible. Accordingly, the inventors of the case devised a method of reducing the calculation load necessary for recommending related items to reduce time necessary for recommending related items.

Hereinafter, an approximate update method of J-matrix will be explained with reference to FIG. 19 to FIG. 21. FIG. 19 to FIG. 21 are explanatory charts for explaining the approximate update method of J-matrix.

First, the processing flow relating to the approximate update method of J-matrix will be explained with reference to FIG. 19. As shown in FIG. 19, first, the server device 11 calculates the J-matrix based on feedback information at a time (t+1) (S141). The calculation method of the J-matrix in Step S141 is the same as the method explained above. Next, the server device 11 compares the J-matrix at a previous time t with the J-matrix at the time (t+1) to calculate an update value δ (S142).

The update value σ is a parameter for approximately calculating the J-matrix at a time (t+2). Here, supplementary explanation of the calculation method of the update value δ will be made.

Figure 20:
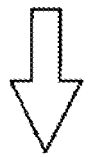
FIG. 20 is an explanatory chart for explaining the update method of the relevance table (J-matrix) according to the first modification example of the embodiment.

As shown in FIG. 20, the server device 11 refers to the number of feedbacks (the case of "purchase" is cited as an example) given to respective items (the number of purchases) from the time t to the time (t+1). In the example of FIG. 20, the number of purchases is the largest in an item 4 (Item 4), the server device 11 selects the item 4. The server device 11 also stores the number of purchases of the selected item 4 as n=64.

Subsequently, the server device 11 refers to the J-matrix at the time t. At this time, the server device 11 refers to elements of the J-matrix J(1, 4), J(2, 4), J(3, 4) relating to the item 4 the number of purchases is the largest. The server device 11 further refers to the J-matrix at the time (t+1). At this time, the server device 11 refers to elements of the J-matrix J(1, 4), J(2, 4), J(3, 4) relating to the item 4 the number of purchases is the largest. Then, the server device 11 compares the elements of the J-matrix J(1, 4), J(2, 4), J(3, 4) at the time t with the elements of the J-matrix J(1, 4), J(2, 4), J(3, 4) at the time (t+1).

The server device 11 selects the maximum value $\Delta J(2, 4)$=0.16 from difference values $\Delta J(1, 4)$=0.12, $\Delta J(2, 4)$=0.16 and $\Delta J(3, 4)$=0.06 of the elements of the J-matrix J(1, 4), J(2, 4), J(3, 4). The maximum value is expressed as d. Furthermore, the server device 11 calculates the update value $\delta$=d/n=0.16/62=0.00258 by using the maximum value d=$\Delta J(2, 4)$. The explanation has been made with the specific example (the case where the feedback type is "purchase"), however, the update value $\delta$ can be calculated in the same manner also in a case where the feedback type or the value of the J-matrix differs.

FIG. 19 is referred to again. After calculating the update value $\delta$ in Step S142, the server device 11 determines whether there is a feedback or not at a next time (t+2) (S143). When there is the feedback, the server device 11 allows the process to proceed to Step S144. On the other hand, when there is no feedback, the server device 11 returns the process to Step S143 and waits for the feedback.

When the process proceeds to Step S144, the server device 11 updates the P-matrix based on the feedback at the time (t+2) (S144). Subsequently, the server device 11 calculates the J-matrix at the time (t+2) by using the update value $\delta$ calculated in Step S142 (S145). However, the J-matrix calculated here is not calculated by the above expressions (1), (2) based on the P-matrix updated in Step S144, therefore, the J-matrix substantially corresponds to the J-matrix at the time (t+2) predicted from the J-matrixes at the time t and the time (t+1).

Here, supplementary explanation concerning the calculation method of the J-matrix at the time (t+2) using the update value a will be made with reference to FIG. 21. A case where the user who gave the feedback (the case of "purchase" is cited as an example in this case) to items 2, 3 in the past has given the feedback to the item 1 at the time (t+2) will be considered.

As shown in FIG. 21, the server device 11 refers to the J-matrix at the time (t+1) first. At this time, the server device 11 pays attention to elements (hereinafter referred to as focused elements) concerning elements concerning combinations between the item 1 purchased at the time (t+2) and items 2, 3 purchased before. Next, the server device 11 adds the update value $\delta$ calculated in Step S142 to values of focused elements at the time (t+1) to calculates the J-matrix at the time (t+2).

As described above, the server device 11 executes update processing of the J-matrix using the update value $\delta$. The server device 11 executes calculation of the J-matrix based on the above expressions (1), (2) by the method described above at a given timing. As described above, high-speed update processing is realized by updating the J-matrix by using the update value $\delta$. Additionally, accumulation of error due to approximation can be suppressed by executing calculation processing of the J-matrix from the P-matrix at the given timing.

The approximate update method of the J-matrix will be explained as the above.

(1-4-2: Update Method of J-Matrix Based on Bias Parameters (Second Modification Example))

Figure 22:
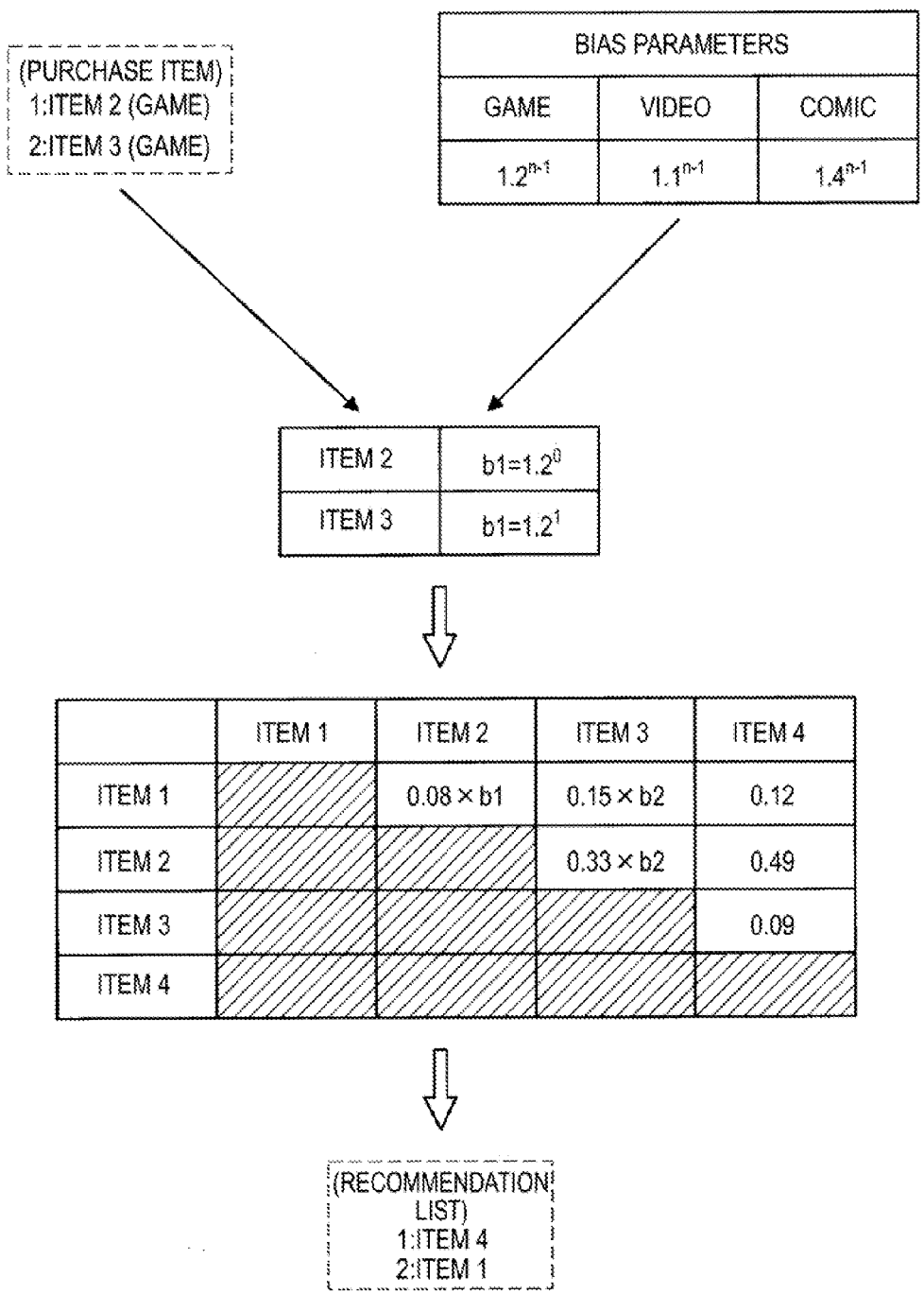
FIG. 22 is an explanatory chart for explaining an update method of the relevance table (J-matrix) using bias parameters according to a second modification example of the embodiment.

Next, an update method of the J-matrix based on bias parameters will be explained with reference to FIG. 22. FIG. 22 is an explanatory chart for explaining the update method of the J-matrix based on the bias parameters. The bias parameters in this case indicate parameters for performing weighting to elements of the J-matrix so as to correspond to the user's taste.

As shown in FIG. 22, the bias parameters are previously determined in accordance with item types. In the example of FIG. 22, the bias parameter is set to $1.2^{n-1}$ when the item is game software, the bias parameter is set to $1.1^{n-1}$ when the item is video software and the bias parameter is set to $1.4^{n-1}$ when the item is comics. n indicates the order of purchasing. For example, when the user purchased the items 2, 3 (game software) sequentially, the server device 11 calculates bias parameters concerning items 2, 3. In this case, a bias parameter b1 of the item 2 will be $1.2^0$=1.0, and a bias parameter b2 of the item 3 will be $1.2^1$=1.2.

After calculating the bias parameters b1, b2, the server device 11 refers to the J-matrix and pays attention to elements of the J-matrix J(1, 2), J(1, 3) and J(2, 3) relating to the items 2, 3. Then, the server device 11 multiplies the element of the J-matrix J(1, 2) by the bias parameter b1 and multiplies the elements of the J-matrix J(1, 3), J(2, 3) by the bias parameter b2. As described above, the server device 11 updated the J-matrix by the bias parameters generates the recommendation list based on the updated J-matrix and recommends related items to the user based on the generated recommendation list.

The above is the explanation of the update method of the J-matrix based on the bias parameters.

[1-5: Hardware Configuration]

Figure 23:
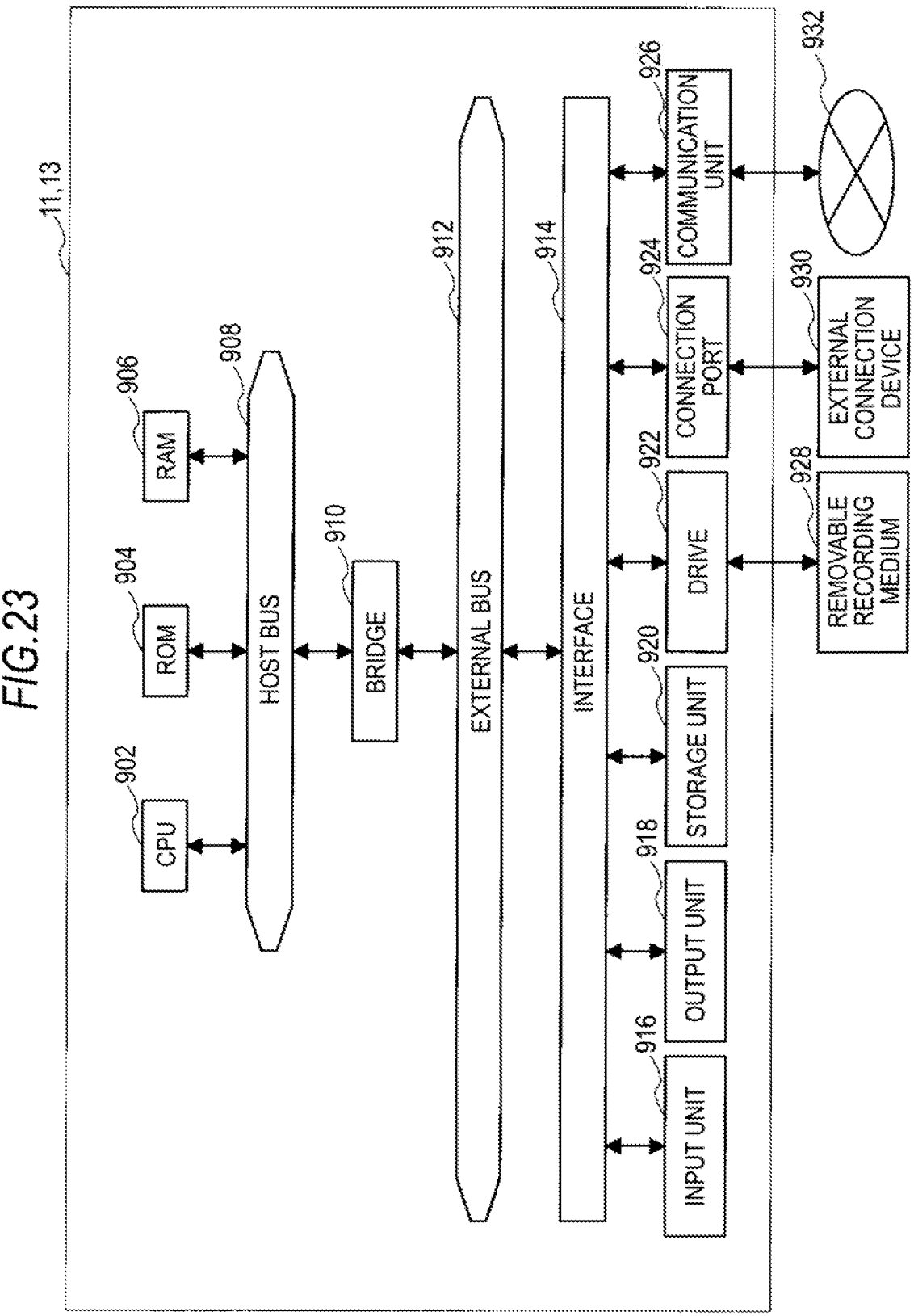
FIG. 23 is an explanatory diagram for explaining a hardware configuration capable of realizing functions of the server device and user terminals according to the embodiment.

Functions of respective components included in the above server device 11 and the user terminals 13 can be realized by using a hardware configuration of an information processing apparatus, for example, shown in FIG. 23. That is, functions of respective components are realized by controlling the hardware shown in FIG. 23 by using a computer program. The form of the hardware is optional, including, for example, a personal computer, information terminals such as a cellular phone, a PHS and a PDA, a game machine and various information home appliances. The PHS is an abbreviation of "Personal Handy-phone System". The PDA is an abbreviation of "Personal Digital Assistant".

As shown in FIG. 23, the hardware chiefly includes a CPU 902, a ROM 904, a RAM 906, a host bus 908 and a bridge 910. The hardware further includes an external bus 912, an interface 914, an input unit 916, an output unit 918, a storage unit 920, a drive 922, a connection port 924 and a communication unit 926. The CPU is an abbreviation of "Central Processing Unit". The ROM is an abbreviation of "Read Only Memory". The RAM is an abbreviation of "Random Access Memory".

The CPU 902 functions as a calculation processing device or a control device, controlling the whole operation of respective components or part thereof based on various types of programs stored in the ROM 904, the RAM 906, the storage unit 920 or a removal recording medium 928. The ROM 904 is a means for storing programs read by the CPU 902, data used for calculation and so on. For example, programs to be read by the CPU 902, various parameters varying appropriately at the time of executing the programs and so on are stored in the RAM 906 temporarily or permanently.

These components are connected to one another, for example, through the host bus 908 capable of transmitting data at high speed. The host bus 908 is connected to, for example, the external bus 912 transmitting data at relatively low speed through the bridge 910. As the input unit 916, for example, a mouse, a keyboard, a touch panel, buttons, switches, levers and so on are used. Additionally, a remote controller capable of transmitting control signals by using infrared rays or other electric waves is occasionally used as the input unit 916.

As the output unit 918, devices capable of notifying acquired information to users visually or auditorily can be used, which are, for example, display devices such as a CRT, an LCD, a PDP and an ELD, audio output devices such as a speaker, headphones and a printer, a cellular phone, a facsimile and so on. The CRT is an abbreviation of "Cathode Ray Tube". The LCD is an abbreviation of "Liquid Crystal Display". The PDP is an abbreviation of "Plasma Display Panel". The ELD is an abbreviation of "Electro-Luminescence Display".

The storage unit 920 is a device for storing various data. As the storage unit 920, for example, a magnetic storage device such as a hard disk drive (HDD), a semiconductor storage device, an optical storage device, a magneto-optical storage device and the like are used. The HDD is an abbreviation of "Hard Disk Drive".

The drive 922 is a device reading information recorded in the removable recording medium 928 such as a magnetic disk, an optical disk, a magneto-optical disk, a semiconductor memory or the like and writing information in the removable recording medium 928. The As the removable recording medium 928, for example, DVD media, Blue-ray media, HD DVD media, various semiconductor storage media and so on can be used. Naturally, the removable recording medium 928 can apply, for example, an IC card on which a non-contact IC chip is mounted, electronic devices and so on. The IC is an abbreviation of "Integrated Circuit".

The connection port 924 is a port for connecting an external connection device 930, which is, for example, an USB port, an IEEE1394 port, a SCSI, an RS-232C port or an optical audio terminal. As the external connection device 930, a printer, a portable music player, a digital camera, a digital video camera, an IC recorder and so on can be cited. The USB is an abbreviation of "Universal Serial Bus". The SCSI is an abbreviation of "Small Computer System Interface".

As the communication unit 926, communication devices for connecting to a network 932 can be used, which are, for example, communication cards for a wired or wireless LAN, Bluetooth (Registered Trademark) and WUSB, a router for optical communication, a router for ADSL, modems for various communications. The network 932 connected to the communication unit 926 includes networks connected by wired or wireless communication, which is, for example, a internet, a home LAN, an infrared communication, a visible light communication, broadcasting, satellite communication or the like. The LAN is an abbreviation of "Local Area Network". The WUSB is an abbreviation of "Wireless USB". Additionally, the ADSL is an abbreviation of "Asymmetric Digital Subscriber Line".

<2: Brief>

Lastly, the technical contents according to the embodiment of the present disclosure are briefly summarized. The technical contents described here can be applied to various information processing apparatuses such as a PC, a cellular phone, a portable game machine, a portable information terminal, information home appliances and a car navigation system.

The functional configuration of the information processing apparatus can be expressed as follows. The information processing apparatus includes a feedback receiving unit, a feedback history storage unit, a relevance calculation unit and a recommendation unit. The feedback receiving unit is a means for receiving feedbacks with respect to items by a user. As the feedbacks, purchase of items, access to information concerning items, evaluation to items and so on.

The feedback history storage unit is a means for storing information of feedbacks received at present or in the past by the feedback receiving unit in units of combinations of users and items. The feedback information includes, for example, purchase history of items, access history of information concerning items, evaluation information with respect to items and so on.

The relevance calculation unit is a means for calculating relevance between items base on first information indicating the degree in which the same user gives feedbacks to both items and second information indicating the degree in which many users give feedbacks by using feedback information stored in the feedback history storage unit when receiving the feedback by the feedback receiving unit. For example, when feedback information indicates purchase history of the user, the first information will be information indicating the number of purchases of items by the same user. The second information will be information indicating the number of items purchased by plural users.

The relevance between items will be the one reflecting the user's taste by considering the above first information. On the other hand, the relevance between items will be the one reflecting the relevance among users through items by considering the second information. That is, the relevance calculated by the relevance calculation unit indicates the relevance between items reflecting the user's taste and the relevance among users. The recommendation unit immediately recommends items having higher relevance with respect to the item to the user who has given the feedback to the item by the feedback receiving unit.

As the result, it is possible to recommend the item to the user selected in consideration of both the user's taste and the relevance among users through the item. Additionally, after the user gives the feedback, the feedback is reflected on the recommendation result immediately, therefore, the item fitted to the user's taste at the time of the feedback is recommended to the user.

(Supplement)

The recommendation system 10 is an example of the item recommendation system. The feedback information update unit 112 and the history table storage unit 121 are examples of the feedback history storage unit. The intermediate-value table generation unit 113 and the relevance calculation unit 114 are examples of the relevance calculation unit. The item recommendation unit 115 is an example of the recommendation unit. The relevance calculation unit 114 is an examples of a variation detection unit and a relevance prediction unit. The taste analyzing unit 116 is an example of a taste information generation unit.

The preferred embodiment of the present disclosure has been explained with reference to the attached drawings, and it goes without saying that the present disclosure is not limited to the above example. It should be understood that those skilled in the art can make various alternations and modifications within the scope of the appended claims and that these naturally belong to the technical scope of the present disclosure.

For example, two types of modification examples are shown in addition to the basic configuration of the embodiment. It is possible to combine the basic configuration with modification examples and the manner of combination is not limited. Additionally, the types of feedbacks, types of bias parameters are specifically shown in the above explanation, however, the technical scope of the embodiment is not limited to these specific examples.

The present disclosure contains subject matter related to that disclosed in Japanese Priority Patent Application JP 2010-135655 filed in the Japan Patent Office on Jun. 15, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An item recommendation system comprising:
   a feedback receiving unit receiving feedback for one of a plurality of items from one of a plurality of users, wherein the feedback includes information for at least one action of a purchase, evaluation, or detail access;
   a feedback history storage unit storing the received feedback and past received feedback from the plurality of users, wherein the received feedback and past feedback are stored as combinations of users and items having feedback given by the users;
   a relevance calculation unit calculating, when feedback is received by the feedback receiving unit, a degree of relevance between the one of the plurality of items and another one of the plurality of items, based on first information indicating a degree and temporal sequence of feedback given by the one of the plurality of users for at least one of the plurality of items, and second information indicating a degree of past feedback given by the plurality of users to the plurality of items stored in the feedback history storage unit; and
   a recommendation unit recommending, upon receiving feedback by the feedback receiving unit, one or more of the plurality of items to the one of the plurality of users, the recommended items having high relevance to the one of the plurality of items, wherein the recommended items are selected based on the degree of relevance calculated by the relevance calculation unit.

2. The item recommendation system according to claim 1, further comprising:
   a variation detection unit detecting a combination of items i and j that has the highest degree of relevance observed between a time $t_1$ and a time $t_2$ by comparing a relevance $J(t_1)$ between items calculated at time $t_1$ by the relevance calculation unit and a relevance $J(t_2)$ between items calculated by the relevance calculation unit at time $t_2$, wherein time $t_2$ follows time $t_1$; and
   a relevance prediction unit predicting a relevance $J(t_3)$ between items at a time $t_3$ which follows time $t_2$, from a difference between relevances $J(t_2)-J(t_1)$ concerning items i, j detected by the variation detection unit, wherein the recommendation unit recommends items based on the relevance calculated by the relevance calculation unit for a first time period and recommends items based on the relevance predicted by the relevance prediction unit for a second time period different from the first time period.

3. The item recommendation system according to claim 2, further comprising:
   a taste information generation unit generating taste information indicating user's taste based on feedback information stored by the feedback history storage unit,
   wherein the taste information generation unit generates taste information based on previously received feedback information stored by the feedback history storage unit, and
   the recommendation unit recommends items in which the taste is higher for the user who has given the feedback to the item by the feedback receiving unit from items having higher relevance based on taste information generated just before receiving the feedback by the feedback receiving unit.

4. The item recommendation system according to claim 3, wherein the recommendation unit recommends items having higher relevance with respect to the item for which feedback is given by the one of the plurality of users based on the degree of relevance calculated by multiplying a at least one bias parameter representing a weighting indicative of taste when a bias parameter is set for each of the of items.

5. The item recommendation system according to claim 4, wherein the feedback history storage unit stores the received feedback and past received feedback in a storage device connected through a network.

6. The item recommendation system according to claim 1, wherein the received feedback and past feedback stored by the feedback history storage unit is organized in a history matrix P(i, u) where u is an identification of the one of the plurality of users and i is an identification of one of the plurality of items, and when P(i, u)=1 is set in the case of receiving the feedback and P(i, u)=0 is set in the case of not receiving the feedback, a relevance $J_{i,j}$ between the item i and another of the plurality of items j (j≠i) is expressed by the following expression (1)

$$J_{i,j} = \frac{\sum_v P(i,v) \cdot P(j,v)}{\sum_v P(i,v) + \sum_v P(j,v) + \sum_v P(i,v) \cdot P(j,v)}. \qquad (1)$$

7. An item recommendation method comprising:
   receiving, by one or more processors, feedback for one of a plurality of a plurality of items from one of a plurality of users, wherein the feedback includes information for at least one action of a purchase, evaluation, or detail access;
   storing, in a feedback history storage unit, the received feedback and past received feedback from the plurality of users, wherein the received feedback and past feedback are stored as combinations of users and items having feedback given by the users;
   calculating, by the one or more processors, a degree of relevance between the one of the plurality of items and another one of the plurality of items based on first information indicating a degree and temporal sequence of feedback given by the one of the plurality of users for at least one of the plurality of items and second information indicating a degree of past feedback given by the plurality of users to the plurality of items stored in the feedback history storage unit; and recommending, by the one or more processors, one or more of the plurality of items to the one of the plurality of users, the recommended items having high relevance to the one of the plurality of items, wherein the recommended items are selected based on the degree of relevance calculated in the calculating, and recommending is performed upon receiving feedback by the one or more processors.

8. A non-transitory computer readable storage medium having stored thereon executable instructions which cause one or more processors to perform the method comprising:

receiving feedback for one of a plurality of items from one of a plurality of users, wherein the feedback includes information for at least one action of a purchase, evaluation, or detail access;

storing the received feedback and past received feedback from the plurality of users, wherein the received feedback and past feedback are stored as combinations of users and items having feedback given by the users;

calculating, when feedback is received by the feedback receiving unit, a degree of relevance between the one of the plurality of items and another one of the plurality of items based on first information indicating a degree and temporal sequence of feedback given by the one of the plurality of users for at least one of the plurality of items, and second information indicating degree of stored past feedback given by the plurality of users to the plurality of items; and recommending one or more of the plurality of items to the one of the plurality of users, the recommended items having high relevance to the one of the plurality of items, wherein the recommended items are selected based on the calculated relevance, and recommending is performed upon receiving feedback.

* * * * *